United States Patent [19]

Schlumpf

[11] Patent Number: 5,609,071
[45] Date of Patent: *Mar. 11, 1997

[54] SHIFTABLE PEDAL BEARING GEARING FOR A BICYCLE OR THE LIKE

[76] Inventor: Florian Schlumpf, Dorfstrasse 10, 7324 Vilters, Switzerland

[*] Notice: The term of this patent shall not extend beyond the expiration date of Pat. No. 5,303,942.

[21] Appl. No.: 383,961

[22] Filed: Feb. 6, 1995

[30] Foreign Application Priority Data

Feb. 7, 1994 [CH] Switzerland .............. 345/94

[51] Int. Cl.$^6$ .............. B62M 11/14; G05G 1/14
[52] U.S. Cl. .............. 74/594.2; 74/594.1; 280/236; 280/238; 280/259; 475/300
[58] Field of Search .............. 74/594.1, 594.2; 280/238, 236, 259, 237; 475/300

[56] References Cited

U.S. PATENT DOCUMENTS

| | | | |
|---|---|---|---|
| 504,168 | 8/1893 | Morris | 280/236 |
| 516,933 | 3/1894 | Jacoby | 280/236 |
| 544,776 | 8/1895 | Souder | 280/238 |
| 603,326 | 5/1898 | Feingold | 280/237 |
| 3,944,253 | 3/1976 | Ripley | 280/238 |
| 4,283,069 | 8/1981 | Citelli | 280/236 |
| 4,583,422 | 4/1986 | Boyd | 74/594.2 |
| 5,303,942 | 4/1994 | Schlumpf | 280/238 |
| 5,435,583 | 7/1995 | Foster | 280/237 |

FOREIGN PATENT DOCUMENTS

| | | |
|---|---|---|
| 873987 | 8/1961 | England . |
| 0562470 | 9/1993 | European Pat. Off. . |
| 419414 | 8/1922 | Germany . |
| 1072105 | 12/1959 | Germany . |
| 3827819 | 3/1989 | Germany ............. 280/238 |

*Primary Examiner*—Vinh T. Luong
*Attorney, Agent, or Firm*—Henry M. Feiereisen

[57] ABSTRACT

A shiftable pedal bearing gearing for use in a pedal bearing of a type having a pedal bearing housing and a crank axle axially traversing the pedal bearing housing and carrying at least one pedal crank, for use in a bicycle or the like, includes a chainwheel mounted on the crank axle and a disk extending parallel to the chainwheel. Arranged between the chainwheel and the disk is a coupler which is rotatably mounted on the crank axle and movable in axial direction between two switching positions. The coupler, on the one hand, and the chainwheel and disk, on the other hand, have opposing sides of complementary configuration to allow interlocking or form-fitting connection at uniform surface pressure between said coupler and the chainwheel in one switching position and the disk in the other switching position.

13 Claims, 4 Drawing Sheets

5,609,071

SHIFTABLE PEDAL BEARING GEARING FOR A BICYCLE OR THE LIKE

BACKGROUND OF THE INVENTION

The present invention refers to a shiftable pedal bearing gearing for a bicycle or the like.

German Patent No. DE-A 38 27 819 discloses a shiftable pedal bearing gearing for a bicycle or the like, which includes a crank axle supported in a pedal bearing housing and operatively connected at both axial ends to a pedal crank. The crank axle supports a chainwheel, a disk arranged parallel to the chainwheel and engaging at least one toothed planet gear for supporting the latter, as well as a coupler. A switch shaft is set coaxially within the crank axle and linked to the coupler in such a manner that a slight pressure upon the switch shaft in axial direction shifts the coupler for connection with either the chainwheel or the disk in a form-fitting manner to effect respective switching operations and to change the speed.

U.S. Pat. No. 5,303,942 discloses a similar pedal bearing gearing for a bicycle or the like, in which the chainwheel and the disk are provided with several circumferentially spaced recesses for effecting a play-free, force-transmitting connection. Each recess of the chainwheel and each recess of the disk is of stepped configuration to define a first recess section and a second recess section, with the coupler in a first stage engaging the first recess section with play and in a second stage snugly fitting in the second recess section with no play.

SUMMARY OF THE INVENTION

It is an object of the present invention to provide an improved shiftable pedal bearing gearing of the above-stated type, by which the force acting upon the force transmitting elements and especially the contact pressure during initiation of the switching operation upon the individual elements is reduced while maintaining an exact switching operation to thereby eliminate or essentially reduce a damaging of the elements.

This object, and others which will become apparent hereinafter, is attained in accordance with the present invention by rotatably mounting the coupler on the crank axle between the chainwheel and the disk, with the coupler being movable in axial direction between two switching positions, and by providing the facing sides of the disk and the chainwheel, on the one hand, and of the coupler, on the other hand in a complementary fashion to effect an interlocking or form-fitting engagement of the coupler with either the chainwheel and the disk when the coupler is moved between the switching positions.

Suitably, the coupler is secured to a driver which is mounted on the switch shaft for displacing the coupler in axial direction when the switch shaft inside the crank axle is actuated from the outside by the operator. Advantageously, the driver extends through two aligned holes in the coupler and is guided in aligned oblong holes of the crank axle by which the displacement of the driver and thus of the coupler is limited between the two switching positions.

In accordance with one embodiment of the present invention, the opposing sides between the coupler and the chainwheel and the disk are shaped in form of circumferentially spaced locking cams with interposed recesses, with the opposing sides complementing each other in such a way that upon engagement between one side of the coupler and the opposite side of the chainwheel or of the disk, the locking cams of the coupler engage the recesses of the opposite side of the chainwheel or the disk. A variation of this type of interlocking connection includes a configuration of the opposing sides in form of complementary serrations.

According to another feature of the present invention, the crank axle and the coupler are of complementary polygonal cross section so that the coupler is prevented from rotating relative to the crank axle but yet a relative movement in axial direction is permitted.

BRIEF DESCRIPTION OF THE DRAWING

The above and other objects, features and advantages of the present invention will now be described in more detail with reference to the accompanying drawing in which:

FIG. 1 is a simplified, schematic view of a pedal bearing equipped with a pedal bearing gearing according to the present invention for use in a bicycle or the like;

DETAILED DESCRIPTION OF PREFERRED EMBODIMENTS

Figure 1:
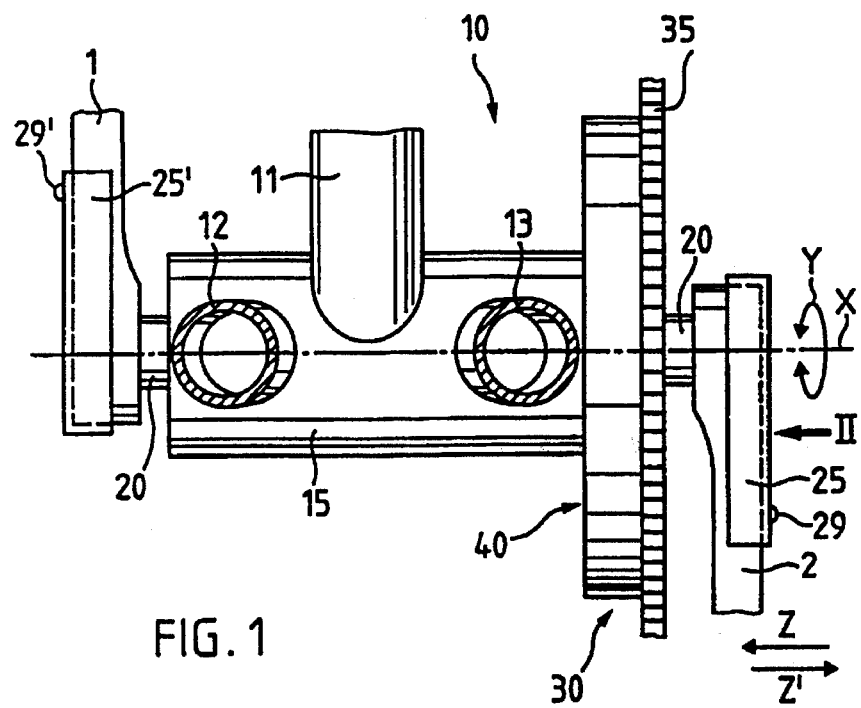

Throughout all the Figures, the same or corresponding elements are always indicated by the same reference numerals.

Turning now to the drawing, and in particular to FIG. 1, there is shown a schematic illustration of a shiftable pedal bearing for a bicycle or the like, generally designated by reference numeral 10 and viewed from the rear fork of the bicycle frame. The pedal bearing 10 includes a pedal bearing housing 15, a hollow crank axle 20 which is supported in and axially traverses the pedal bearing housing 15 and carries pedal cranks 1, 2 on its opposing axial ends.

Figure 2:
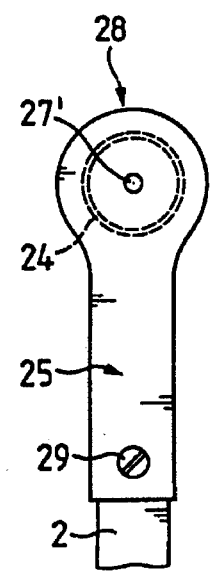
FIG. 2 is a plan view, on an enlarged scale, taken in direction of line II in FIG. 1 of a shifter arranged on one pedal crank, forming part of the switching mechanism.

Mounted to the pedal bearing 10 is a gearing, generally designated by reference numeral 30 and operatively connected to the crank axle 20. The gearing 30 has a gear casing 40 which is connected to a chainwheel 35 with external teeth 36 (FIG. 5) driven by a chain from the pedal crank 1, 2. The pedal cranks 1, 2 are rotatably mounted on the crank axle 20 for rotation about an axis X in direction of arrow Y. Operation of the gearing 30 is initiated by shifters 25, 25' which are respectively secured to the pedal cranks 1, 2 via a fastener 29, e.g. a screw fastener, as best seen in FIG. 2. The shifters 25, 25' and tiltable relative to the pedal cranks 1, 2 for movement in axial direction as indicated by arrows Z and Z'.

The pedal bearing housing 15 is attached to the bicycle frame which, for ease of illustration, is only illustrated fragmentarily in FIG. 1 by the seat tube 11 and by two fork tubes 12 and 13 which are part of the rear fork. The seat tube 11 as well as the fork tubes 12 and 13 are attached to the pedal bearing housing 15 by any suitable means, e.g. through welding.

Figure 3:
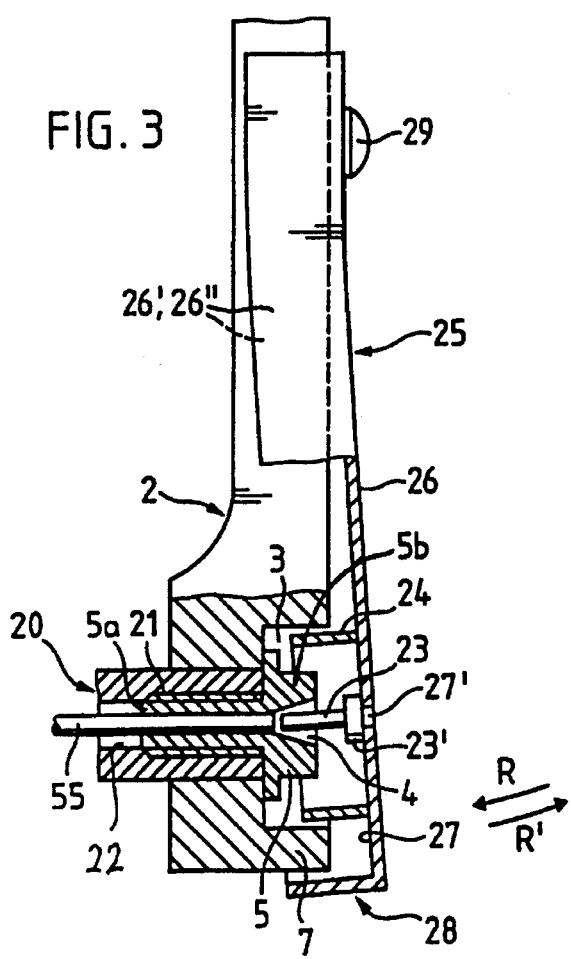
FIG. 3 is a partially sectional side view of the shifter of FIG. 2 shown in one switching position.

Turning now to FIG. 3, there is shown an exemplified partially sectional view of one of the shifters, i.e. shifter 25, in one switching position. Although not shown in the drawing, it will be understood that the other shifter 25' is of same structure and configuration. The crank axle 20 includes an axial bore 22 in which a switch shaft 55, acting as tappet, is accommodated and supported on one axial end by a T-shaped adjusting member 5 with a head 5a resting upon the axial end of the crank axle 20 and an elongated threaded piece 5b screwed into the internal thread 21 along the axial end section of the crank axle 20. The switch shaft 55 is centered in a respective bore of the adjusting member 5 and terminates at a flared recess 4 of the head 5a in opposition to the shifter 25. Guided in the recess 4 is a switch bolt 23 which has a head 23' mounted to the inside wall surface 27 of a rear wall 26 of the shifter 25. In order to precisely set the shift point relative to the switch axis 55, the bolt 23 is adjustable relative to the switch shaft 55 through application of a particular tool, for example a screw driver or the like which is inserted through a bore 27' in the rear wall 26 of the shifter 25.

Figure 4:
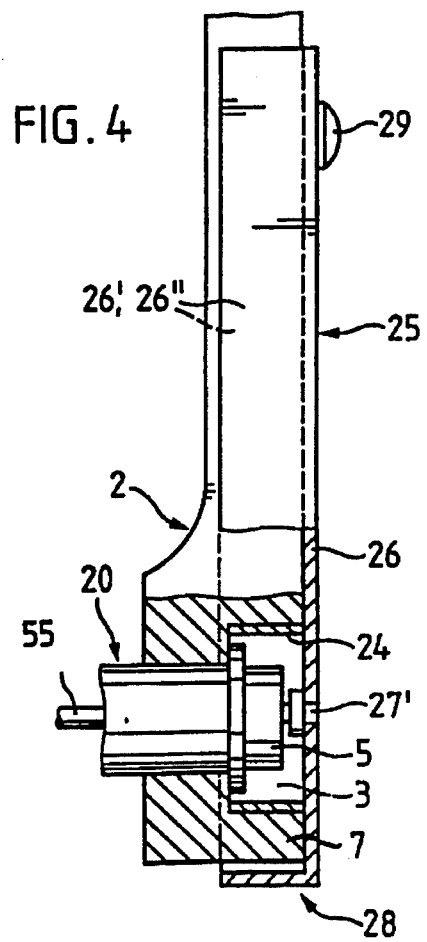
FIG. 4 shows a partially sectional side view of the shifter in the other switching position.

In FIG. 3, the shifter 25 occupies the one switching position in which the switch bolt 23 is disengaged through movement in direction of arrow R' away from the switch shaft 55, while FIG. 4 shows the other switching position in which the shifter 25 is moved in direction of arrow R towards the pedal crank 2 so that the switch bolt 23 strikes the switch shaft 55 to move the latter in axial direction.

The shifter 25 is of substantially U-shaped cross section formed by the rear wall 26, two side walls 26', 26" and a cap 28 which surrounds the respective pedal crank 2. Extending inwardly from the inside surface 27 of the rear wall 26 is a sleeve 24 which is engageable in a recess 3 of the pedal crank 2. The recess 3 is dimensioned in such a manner that during movement of the sleeve 24 about the axis of the screw fastener 29 in direction of arrow R relative to the pedal crank 2, the switch bolt 23 engages the switch shaft 55 and disengages from the switch shaft 55 upon movement in direction of arrow R'. In this switching position, the cap 28 at one end of the shifter 25 surrounds a lower projection 7 of the crank pedal 2.

The shifters 25, 25' are suited to each other in such a manner that when one of the shifters 25, 25' occupies one of the switching position shown in FIGS. 3 and 4, the other one of the shifters 25, 25' occupies the other switching position.

Persons skilled in the art will understand that the switching mechanism as described above and the manner of engagement between the switch shaft 55 and the shifters 25, 25' may also be substituted by a switching mechanism as disclosed in U.S. Pat. No. 5,303,942, describing shifters of generally cap-shaped configuration which are respectively incorporated in the pedal cranks.

Figure 5:
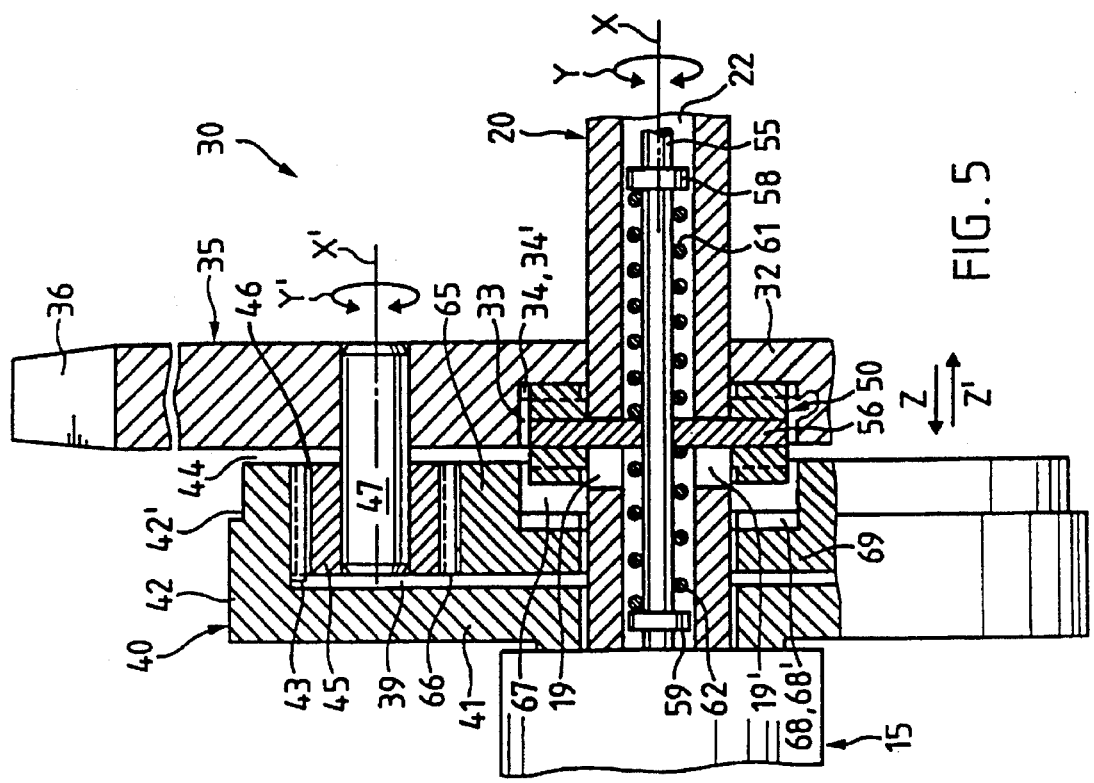
FIG. 5 is a sectional view of one embodiment of a pedal bearing gearing according to the present invention.

Referring now to FIG. 5, there is shown a sectional view of a first embodiment of the pedal bearing gearing 30 for effecting the switching operations. The gear casing 40 of the gearing 30 has a rear wall 41 which is mounted to the pedal bearing housing 15 and is connected in one piece to an annulus 42, with the rear wall 41 and the annulus 42 defining an interior space 39. The annulus 42 is spaced from the chainwheel 35 at formation of a gap 44 and is provided with internal teeth 43. At a distance to its external teeth 36, the chainwheel 35 is provided with a bore which receives a bearing pin 47 having one axial end terminating flush with the outer surface of the chainwheel 35 and another axial end projecting beyond the opposing side face of the chainwheel 35 to rotatably support a planet wheel 45 for rotation about the axis X' in direction of arrow Y'. The planet wheel 45 has external teeth 46 in mesh with the internal teeth 43 of the annulus 42 and in mesh with external teeth 66 of a disk 65 which is set in the recess 39 and rotatably supported on the crank axle 20. The disk 65 represents the sun wheel of a respective planetary gear train which is defined by the annulus 42, the sun wheel 65 and the planet wheel 45.

Persons skilled in the art will understand that the planetary gear train is described by way of example only and may certainly incorporate more than one planet wheel 45. For example, the chainwheel 35 may support two diametrically opposed planet wheels 45 which are in engagement with the sun wheel 65 and the internal teeth 43 of the annulus 42. Certainly, more than two planet wheels 45 may also be provided which are for example evenly distributed about the circumference of the chainwheel 35.

As further shown in FIG. 5, the annulus 42 is provided on the outside surface with a circumferential groove 42' for attachment of a not shown cover by which a penetration of splash water, dust or dirt through the gap 44 into the interior space 39 and between the housing 40 and the chainwheel 35 is eliminated.

At its side facing the disk-shaped sun wheel 65, the chainwheel 35 is provided with a recess 33 which is bounded by a wall section 32 of the chainwheel 35. In opposition to the recess 33 of the chainwheel 35, the sun wheel 65 is provided with a recess 67 which is bounded by a wall section 69, with both recesses 33, 67 forming a cavity for receiving a coupler 50 which is rotatably mounted on the crank axle 20 between the chainwheel 35 and the sun wheel 65 and movable in axial direction between two switching positions in direction of arrows Z and Z' in response to the actuation of the shifters 25, 25'.

The inside face of the wall section 32 of the chainwheel 35 forms part of a locking mechanism in cooperation with the facing side of the coupler 50 and includes a plurality of locking cams 34 which are spaced evenly about the circumference of the chainwheel 35 and distanced from each other by interposed recesses 34'. Likewise, the inside face of the wall section 69 of the sun wheel 65 forms part of the locking mechanism in cooperation with the facing side of the coupler 50 and includes also a plurality of locking cams 68 which are spaced evenly about the circumference of the sun wheel 65 and distanced from each other by interposed recesses 68'. In order to attain an interlocking engagement of the coupler 50 with either the chainwheel 35 or the sun wheel 65 in the two switching positions, the coupler 50 is configured in a manner best seen in FIGS. 9 to 11.

Figure 10:
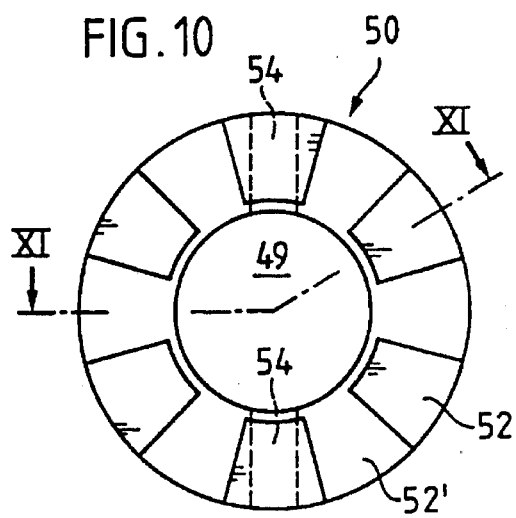
FIG. 10 is a side view of the coupler of FIG. 9 in direction of arrow X.
Figure 9:
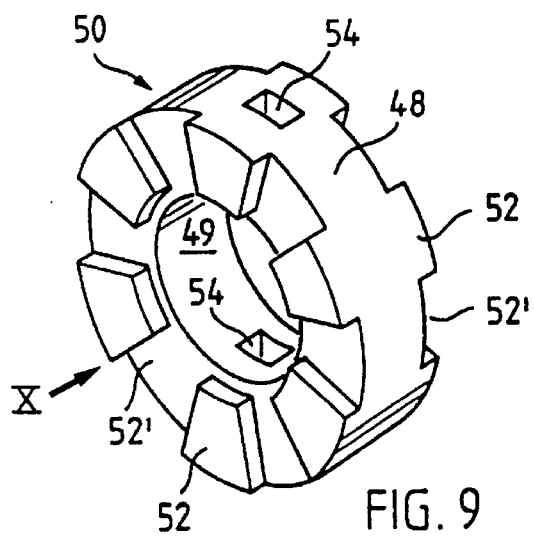
FIG. 9 is a perspective illustration of a coupler of the pedal bearing gearing according to FIGS. 5 to 7.
Figure 11:
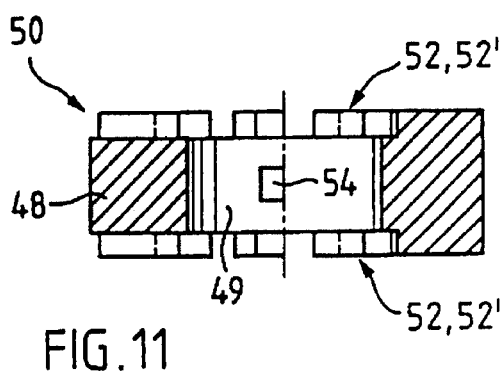
FIG. 11 is a sectional view of the coupler, taken along the line XI—XI in FIG. 10.

As shown in FIGS. 9 to 11, the coupler 50 is configured in form of a ring 48 which is provided with a central bore 49 for traversal by the crank axle 20. Spaced about the circumference of each side of the coupler 50 are a plurality of locking cams 52 with interposed recesses 52'. The locking cams 52 are positioned about the ring 48 in such a manner that upon movement of the coupler 50 towards the chainwheel 35 or the sun wheel 65, the cams 52 engage the recesses 34' or 68' of the chainwheel 35 or the sun wheel 65, depending on the switching position. The ring 48 is further provided with aligned central bores 54 for receiving a driver 56 by which the coupler 50 is moved in direction of arrows Z, Z' in response to an axial displacement of the switch shaft 55 as effected by the shifters 25, 25'. The driver 56 extends through two aligned oblong holes 19, 19' in the crank axle 20 and is securely mounted to the switch shaft 55. Bearing upon each side of the driver 56 is one end of a compression spring 61, 62 which extends respectively over a section of the switch shaft 55, with their other end being supported by an abutment 58, 59. Each of the abutments 58, 59 is mounted on the switch shaft 55 and adjustable in axial direction for setting the restoring force of both compression springs 61, 62 in a desired manner.

During operation, the operator (cyclist) can actuate one of the shifters 25, 25' to displace the switch shaft 55 in either direction indicated by arrows Z, Z' so as to move the driver 56 and thus the coupler 50 between the chainwheel 35 and the sun wheel 65 in order to effect a respective switching operation. When actuating e.g. the shifter 25 to move from the position shown in FIG. 3 into the position shown in FIG. 4, the opposing shifter 25' is moved from the position shown in FIG. 4 into the position shown in FIG. 3.

Figure 6:
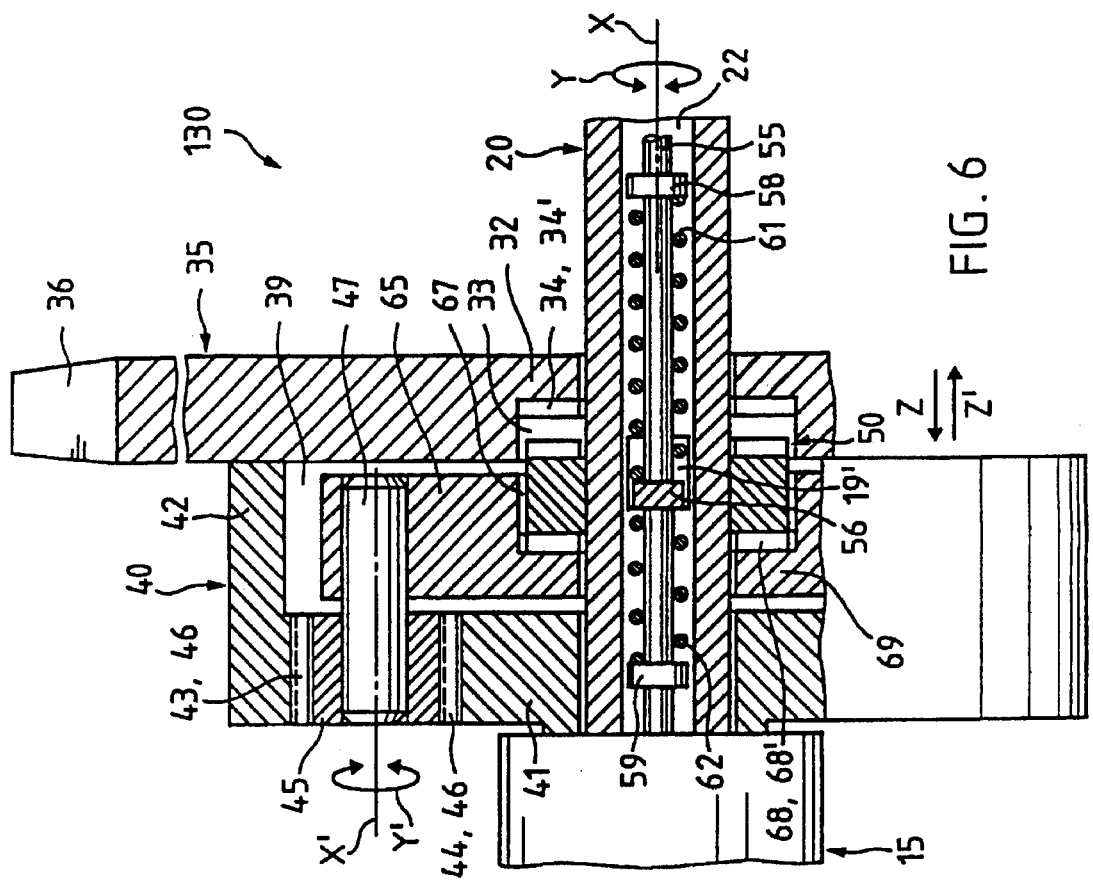
FIG. 6 is a sectional view of a variation of a pedal bearing gearing according to the present invention.

Turning now to FIG. 6, there is shown a partially sectional view of a modified embodiment of a pedal bearing gearing according to the present invention, generally designated by reference numeral 130. It is noted that same reference numerals are used to designate same or corresponding elements as used in connection with the embodiment of FIG. 5. In the embodiment of FIG. 6, the gear casing 40 formed by the annulus 42 and the rear wall 41 is securely mounted laterally to the chainwheel 35 by suitable means, e.g. screw fasteners or the like. Thus, there is no gap formed between the casing 40 and the chainwheel 35 so that the provision of a cover to protect the interior space from contamination is not required. The rear wall 41 of the housing 40 is connected to the pedal bearing housing 15 and provided with external teeth 44 in mesh with the internal teeth 43 of the annulus 42. The annulus 42 as well as the rear wall 41, which thus forms the sun wheel, are operatively connected by at least one planet wheel 45 which is provided with external teeth 46. Persons skilled in the art will understand that several diametrically opposed planet wheels 45 may be provided with their external teeth 46 in engagement with the internal teeth 43 of the annulus 42. The annulus 42, the rear wall 41 as well as the chainwheel 35 form the internal space 39 for receiving the disk 65 mounted upon the crank axle 20.

Traversing the disk 65 is at least one bearing bolt 47 which has one end flush with the surface of the disk 65 facing the chainwheel 35 and with the other end extending beyond the disk 65 and received in the planet wheel 45 which is rotatable about axis X' in direction of arrow Y'. The external teeth 46 of the planet wheel 45 are in mesh with the internal teeth 43 of the annulus 42 and in mesh with the external teeth 44 of the rear wall 41. It will be understood by persons skilled in the art that several planet wheels 54 may be supported by the disk 65 with meshing teeth 46 and 44.

The configuration and arrangement of the coupler 50 is the same as described in connection with the embodiment of FIG. 5. However, in FIG. 6, the crank axle 20 with the oblong holes 19, 19' which oppose each other diametrically in the area of the disk 65 and the chainwheel 35 as well as the coupler 50 are rotated by 90° about the axis X in direction of arrow Y compared to the position shown in FIG. 5. Thus, only the cross section of the driver 56 is visible together with the oblong hole 19' of the crank axle 20. The operation of the switching mechanism is effected in a same manner as described above in connection with FIG. 5.

Figure 7:
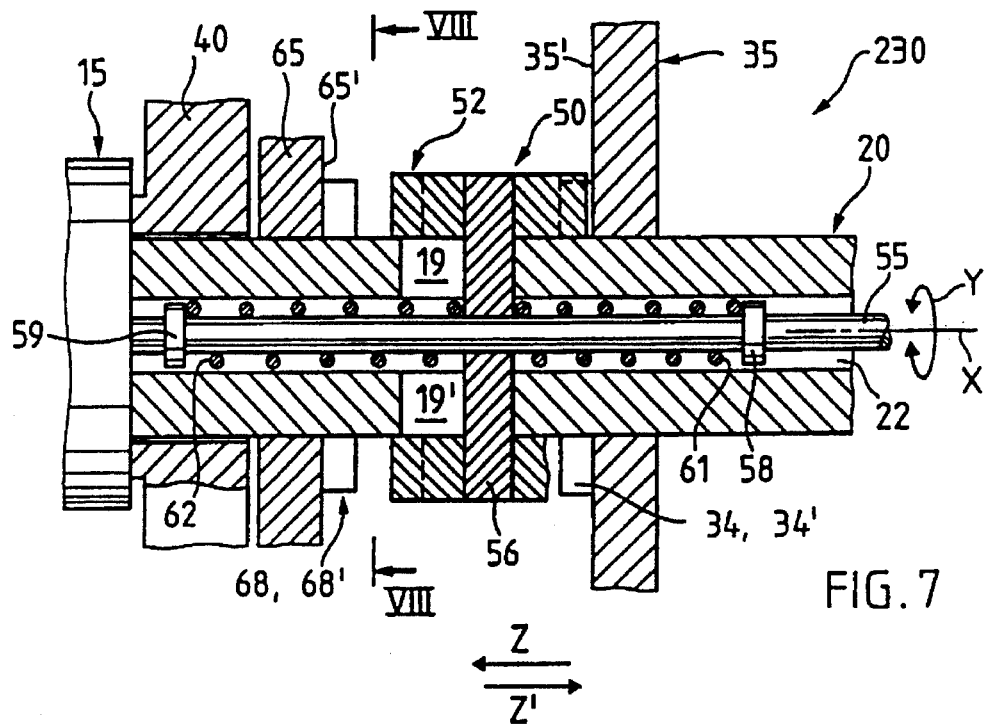
FIG. 7 is a sectional view of still another variation of a pedal bearing gearing according to the present invention.

Turning now to FIG. 7, there is shown a further modification of a pedal bearing gearing according to the present invention, generally designated by reference numeral 230. In contrast to the previously described embodiments, the chainwheel 35 and the disk 65 are not provided with recesses for receiving the coupler 50. Rather the locking cams 34 with the interposed recesses 34' are evenly spaced in circumferential direction about a flat end face 35' of the chainwheel 35, and the locking cams 68 with interposed recesses 68' are spaced in circumferential direction about a flat end face 65' of the disk 65, facing the chainwheel 35. The coupler 50 has a same configuration as shown in FIG. 9 and is thus provided with complementary locking cams 52 for interlocking engagement of the coupler 50 with the chainwheel 35 and the disk 65 in the respective switching positions. In all other aspects, the pedal bearing gearing 230 corresponds to the previously described pedal bearing gearing 30, 130.

Figure 8:
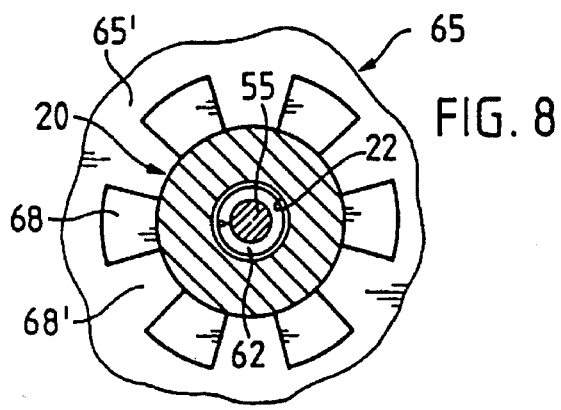
FIG. 8 is a partially sectional view of a disk, taken along the line VIII—VIII in FIG. 7.

FIG. 8 shows a partially sectional view of the end face of the disk 65 taken along the line VIII—VIII in FIG. 7. The end face 65' of the disk 65 is provided with the locking cams 68 which are evenly spaced about the circumference with interposed recesses 68'. It will be understood by persons skilled in the art that the configuration of the disk 65 shown in FIG. 8 is done by way of example only and is certainly also applicable for the disk 65 illustrated in the embodiments of FIGS. 5 and 6.

Figure 12:
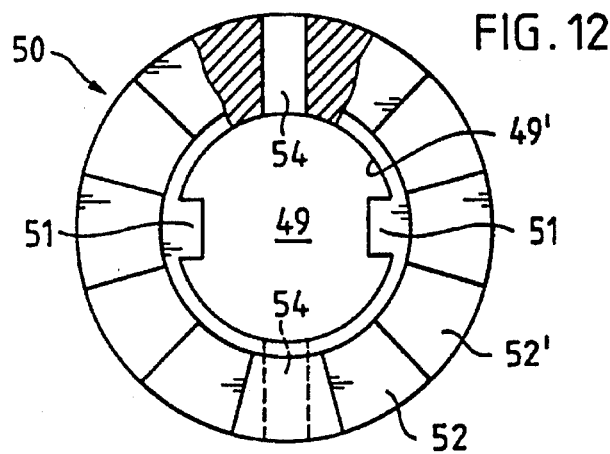
FIG. 12 is a partially sectional side view of a modified coupler according to the present invention.
Figure 13:
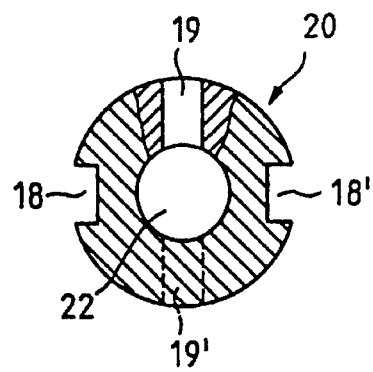
FIG. 13 is a sectional view of a crank axle for connection with the coupler of FIG. 12.

FIGS. 12 and 13 show sectional views of a interlocking engagement between the coupler 50 and of crank axle 20. The coupler 50 is provided with two projections 51 which diametrically oppose each other and extend, offset to the bores 54 by 90°, inwardly from the inside wall 49' of the ring 48 into the bore 49. The projections 51 engage respective grooves 18 (FIG. 13) of the crank axle 20 to provide an interlocking connection between the coupler 50 and the crank axle 20. The grooves 18 extend offset by 90° relative to the bores 19, 19'.

In this manner, the coupler 50 follows a rotation of the crank axle 20 during pedaling while yet allowing an axial displacement of the coupler 50 in direction of arrows Z, Z' toward the chainwheel 35 and the disk 65 to effect the two switching positions as previously described.

Persons skilled in the art will understand that the described tongue and groove connection between the coupler 50 and the crank axle 20 is described by way of example only. This type of connection can certainly be substituted by other form-fitting connections which allow a relative displacement of the coupler in axial direction to the crank axle during rotation of the crank axle together with the coupler. One such example includes a complementary design of the cross section of the coupler 50 and the crank axle 20 e.g. in form of a complementary polygonal shape or the like.

Figure 14:
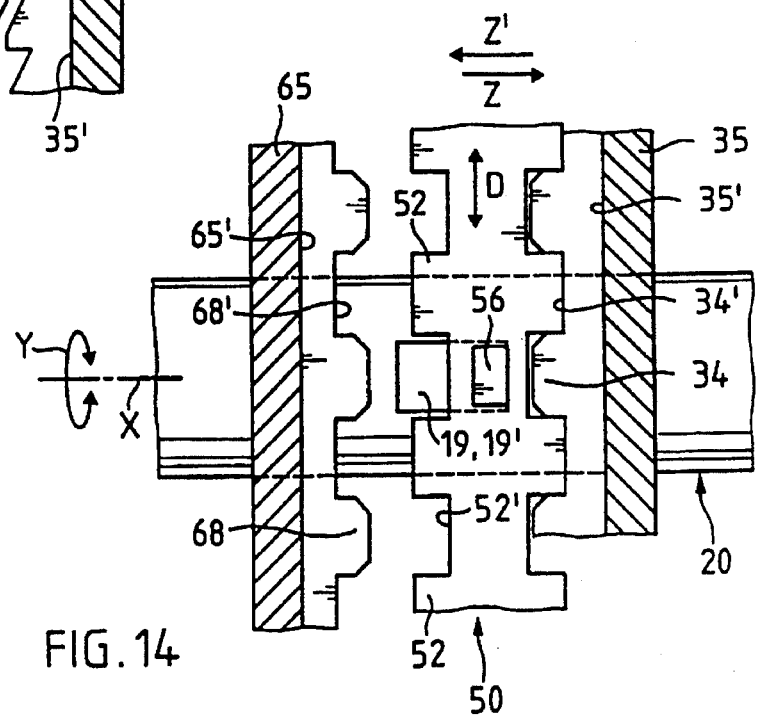
FIG. 14 is a developed view of the coupler for respective engagement with the disk and the chainwheel in the two switching positions.

Turning now to FIG. 14, there is shown an enlarged developed view of the switching operation of the coupler 50.

During rotation of the crank axle 20, indicated by the double arrow D (corresponding to the rotation about the axis X in direction of arrow Y), an actuation of the shifter 25' at pedal crank 1 results in a displacement of the switch shaft 55 and thus of the coupler 50 via the driver 56 in direction of arrow Z into form-fitting engagement with the chainwheel 35. Through actuation of the shifter 25 at the opposite pedal crank 2, the coupler 50 can be displaced in direction of arrow Z' for engagement with the disk 65. In order to enable an optimum interlocking of the coupler 50 with the disk 65 or the chainwheel 35, at least the locking cams 68 of the disk 65 and the locking cams 34 of the chainwheel 35 are provided with beveled corners. This example of an interlocking connection of the coupler 50 with the chainwheel 35 and the disk 65 may find use e.g. in a pedal bearing gearing with back pedal brakes which are loaded in direction of double arrow D.

Figure 15:
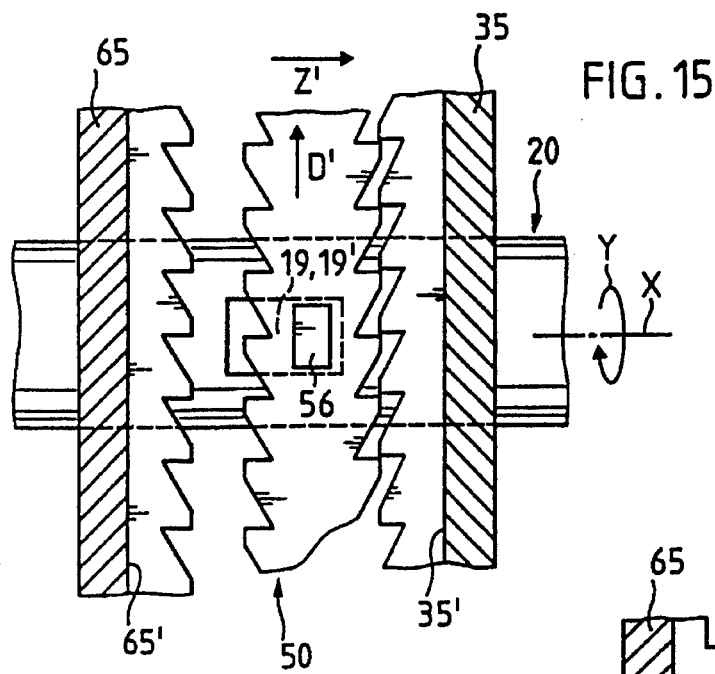
FIG. 15 is a developed view of modified coupler according to the present invention for respective engagement with the disk and the chainwheel in the two switching positions.

FIG. 15 shows a variation of the interlocking mechanism between the coupler 50, on the one hand, and the chainwheel 35 and the disk 65, on the other hand. As shown in FIG. 15, both sides of the coupler 50 are of serrated configuration for engagement with the serrated end face 65' of the disk 65 and serrated end face 35' of the chainwheel 35. As shown in FIG. 15, the coupler 50 is moved in direction of arrow Z' and about to engage with the serrated end face 35' of the chainwheel 35. Upon shifting of the switch shaft 55, a full engagement of the coupler 50 with the chainwheel 35 is effected. The formed serration of the chainwheel 35 and the disk 65 as well as of the coupler 50 allows a load only in direction of arrow D'. Suitably, the serrations are formed without peaks to avoid a premature wear and to eliminate the danger of fracturing.

While the invention has been illustrated and described as embodied in a shiftable pedal bearing gearing for a bicycle or the like, it is not intended to be limited to the details shown since various modifications and structural changes may be made without departing in any way from the spirit of the present invention.

What is claimed as new and desired to be protected by Letters Patent is set forth in the appended claims:

1. A shiftable pedal bearing for use in a pedal-driven vehicle, comprising:

a housing;

a crank axle axially traversing the housing and carrying at least one pedal crank; and a gearing including
      a chainwheel mounted on said crank axle;

a disk mounted on said crank axle in parallel relationship to said chainwheel, said chainwheel and said disk having opposing end faces of a configuration as to form part of a locking mechanism;
      a coupler rotatably mounted on said crank axle between said chainwheel and said disk and being movable in axial direction between two switching positions, said coupler having opposite sides extending perpendicular to said crank axle and respectively facing said end faces of said chainwheel and said disk, said sides of said coupler being configured as to form another part of the locking mechanism so that said coupler is in interlocked engagement with said chainwheel to rotate therewith in one of the switching positions and in interlocked engagement with said disk to rotate therewith in the other one of the switching positions; and actuating means secured to said crank axle and operatively connected to said coupler for shifting said coupler between the switching positions.

2. The pedal bearing defined in claim 1 wherein said actuating means includes a switch shaft set within said crank axle and actuated from outside, and further comprising a driver mounted perpendicular on said switch shaft and secured to said coupler, said driver being guided in diametrically opposed oblong holes of said crank axle for displacement in axial direction.

3. The pedal bearing defined in claim 2 wherein said coupler has two opposed openings for receiving said driver.

4. The pedal bearing defined in claim 2 wherein said oblong holes have a length defining a maximum displacement range for said coupler between said switching positions.

5. The pedal bearing defined in claim 1 wherein said sides of said coupler are provided with a plurality of locking cams distanced from each other by recesses and evenly spaced in circumferential direction.

6. The pedal bearing defined in claim 1 wherein said opposing end faces of said chainwheel and said disk are each defined by a wall formed inside a recess of said chainwheel and said disk, said wall of said chainwheel and said wall of said disk being provided with a plurality of locking cams distanced from each other by recesses and evenly spaced in circumferential direction.

7. The pedal bearing defined in claim 1 wherein said opposing end faces of said chainwheel and said disk are each provided with a plurality of locking cams distanced from each other by recesses and evenly spaced in circumferential direction.

8. The pedal bearing gearing in claim 1 wherein said opposing end faces of said chainwheel and said disk are of serrated configuration, said sides of said coupler being of complementary serrated configuration to allow interlocking engagement of said coupler with said chainwheel and said disk in said switching positions.

9. The pedal bearing gearing in claim 1, further comprising a tongue and groove joint for effecting a form-fitting connection of said crank axle with said coupler in the displacement range of said coupler.

10. The pedal bearing defined in claim 1 wherein said crank axle and said coupler are of complementary polygonal cross section in the displacement range of said coupler.

11. The pedal bearing defined in claim 1 wherein said one part and said other part of said locking mechanism are provided in form of complementary interlocking toothing.

12. The pedal bearing defined in claim 2 wherein said actuating means includes a shifter secured to said switch shaft and having a switch bolt which moves in response to actuation of the shifter in axial direction of said switch shaft for allowing a displacement of said switch shaft between the first and second switching positions.

13. A shiftable pedal bearing for use in a pedal-driven vehicle, comprising a housing;

a crank axle axially traversing said pedal bearing housing and carrying at least one pedal crank;

a gearing secured to said housing and having a chainwheel mounted on said crank axle, a disk mounted on said crank axle in parallel relationship to said chainwheel, and a coupler rotatably mounted on said crank axle between said chainwheel and said disk and being movable in axial direction between a first switching position in which said coupler is in interlocked engagement with said chainwheel to rotate therewith and a second position in which said coupler is in interlocked engagement with said disk to rotate therewith, to thereby effect a rotation of said crank axle at different speeds; and actuating means secured to said crank axle and operatively connected to said coupler for shifting said coupler between the first and second switching positions.

* * * * *